United States Patent
Masuda et al.

(10) Patent No.: US 8,939,519 B2
(45) Date of Patent: Jan. 27, 2015

(54) VEHICLE BRAKE DEVICE

(71) Applicant: Advics Co., Ltd., Kariya (JP)

(72) Inventors: Yoshio Masuda, Kariya (JP); Hiroaki Niino, Toyota (JP); Takashi Kurokawa, Nagoya (JP)

(73) Assignee: Advics Co., Ltd., Kariya, Aichi-Pref (JP)

( * ) Notice: Subject to any disclaimer, the term of this patent is extended or adjusted under 35 U.S.C. 154(b) by 91 days.

(21) Appl. No.: 13/684,359

(22) Filed: Nov. 23, 2012

(65) Prior Publication Data

US 2013/0127238 A1    May 23, 2013

(30) Foreign Application Priority Data

Nov. 23, 2011    (JP) .................................. 2011-255643

(51) Int. Cl.
*B60T 8/40*    (2006.01)
*B60T 13/14*   (2006.01)

(52) U.S. Cl.
CPC .............. *B60T 13/142* (2013.01); *B60T 8/4077* (2013.01); *B60T 13/147* (2013.01)
USPC ....................................................... 303/114.1

(58) Field of Classification Search
USPC .................... 303/14, 20, 114.1, 155; 188/358; 60/553, 563
See application file for complete search history.

(56) References Cited

U.S. PATENT DOCUMENTS

| | | | |
|---|---|---|---|
| 5,954,406 A | 9/1999 | Sawada | |
| 2007/0278855 A1* | 12/2007 | Hatano | 303/116.1 |
| 2008/0257670 A1* | 10/2008 | Drumm et al. | 188/358 |
| 2011/0285199 A1* | 11/2011 | Ishida | 303/3 |
| 2012/0247100 A1* | 10/2012 | Yamasoe et al. | 60/553 |
| 2013/0127238 A1* | 5/2013 | Masuda et al. | 303/6.01 |
| 2013/0127240 A1* | 5/2013 | Noro et al. | 303/14 |
| 2013/0127241 A1* | 5/2013 | Sakata | 303/14 |
| 2013/0162012 A1* | 6/2013 | Ishida | 303/11 |
| 2013/0221736 A1* | 8/2013 | Kuki et al. | 303/20 |
| 2013/0269338 A1* | 10/2013 | Isono | 60/563 |
| 2014/0008967 A1* | 1/2014 | Takeuchi et al. | 303/155 |

FOREIGN PATENT DOCUMENTS

| | | |
|---|---|---|
| JP | 09-328069 A | 12/1997 |
| JP | 2010-167915 A | 8/2010 |
| WO | WO-2010084412 A1 | 7/2010 |

* cited by examiner

*Primary Examiner* — Christopher Schwartz
(74) *Attorney, Agent, or Firm* — Buchanan Ingersoll & Rooney PC

(57) ABSTRACT

A vehicle brake device includes a master cylinder having a master piston moved by servo pressure in a servo chamber and master pressure of a master chamber is changed by movement of the master piston. A mechanical servo pressure generating unit is connected to a high pressure source and the servo chamber, and generates a servo pressure within the servo chamber according to pilot pressure within a pilot chamber based on brake fluid pressure of the high pressure source. An electrical pilot pressure generating unit is connected to the pilot chamber and generates desired pilot pressure within the pilot chamber, and a master chamber-to-pilot chamber brake fluid line connects the master chamber with the pilot chamber so pilot pressure is generated by the pilot pressure generating unit during normal operation of a power supply system, and the master pressure is used as pilot pressure when the power supply system fails.

10 Claims, 7 Drawing Sheets

Fig. 1

VEHICLE BRAKE DEVICE

TECHNOLOGICAL FIELD

The present invention relates to a vehicle brake device in which a braking force imparted to a vehicle is controlled in accordance with a brake pedal operation amount by a driver.

BACKGROUND DISCUSSION

As an example of a vehicle brake device in which a braking force imparted to a vehicle is controlled in accordance with a brake pedal operation amount by a driver, vehicle brake devices disclosed, for example, in JP-A-2010-167915 (Patent Literature 1) and JP-A-9-328069 (Patent Literature 2) are known. In these vehicle brake devices, a braking force based on a controlled hydraulic pressure generated by an accumulator and an electromagnetic valve is imparted to wheel cylinders in response to the movement of an input piston.

However, when a power supply system fails, no electric power is supplied to the electromagnetic valve, and the servo pressure cannot be controlled. Namely, it is not possible to increase the servo pressure according to the operation amount of the brake pedal by electrically controlling the pressure. When this occurs, the braking force cannot be exhibited when the power supply fails.

SUMMARY

The invention has been made in view of these situations, and an object thereof is to provide a vehicle brake device which can exhibit a braking force according to an operation amount of a brake control member even when a power supply system fails.

According to the invention, a vehicle brake device is provided which includes a master cylinder in which master piston is driven so as to move by a servo pressure in a servo chamber and a master pressure which is a pressure of master chambers is changed by the movement of the master pistons, a mechanical servo pressure generating unit that is connected to a high pressure source and the servo chamber and which generates a servo pressure within the servo chamber according to a pilot pressure within a pilot chamber based on a brake fluid pressure of the high pressure source, an electrical pilot pressure generating units that are connected to the pilot chamber and which generates a desired pilot pressure within the pilot chamber, and a master chamber-to-pilot chamber brake fluid line which connects the master chamber with the pilot chamber, wherein when a power supply system operates normally, the pilot pressure is generated by the pilot pressure generating unit, when the power supply system fails, the master pressure is used as a pilot pressure.

BRIEF DESCRIPTION OF THE DRAWING FIGURES

FIG. 1 is a block diagram depicting the configuration of a vehicle brake device of a first embodiment;

DETAILED DESCRIPTION

Figure 2:
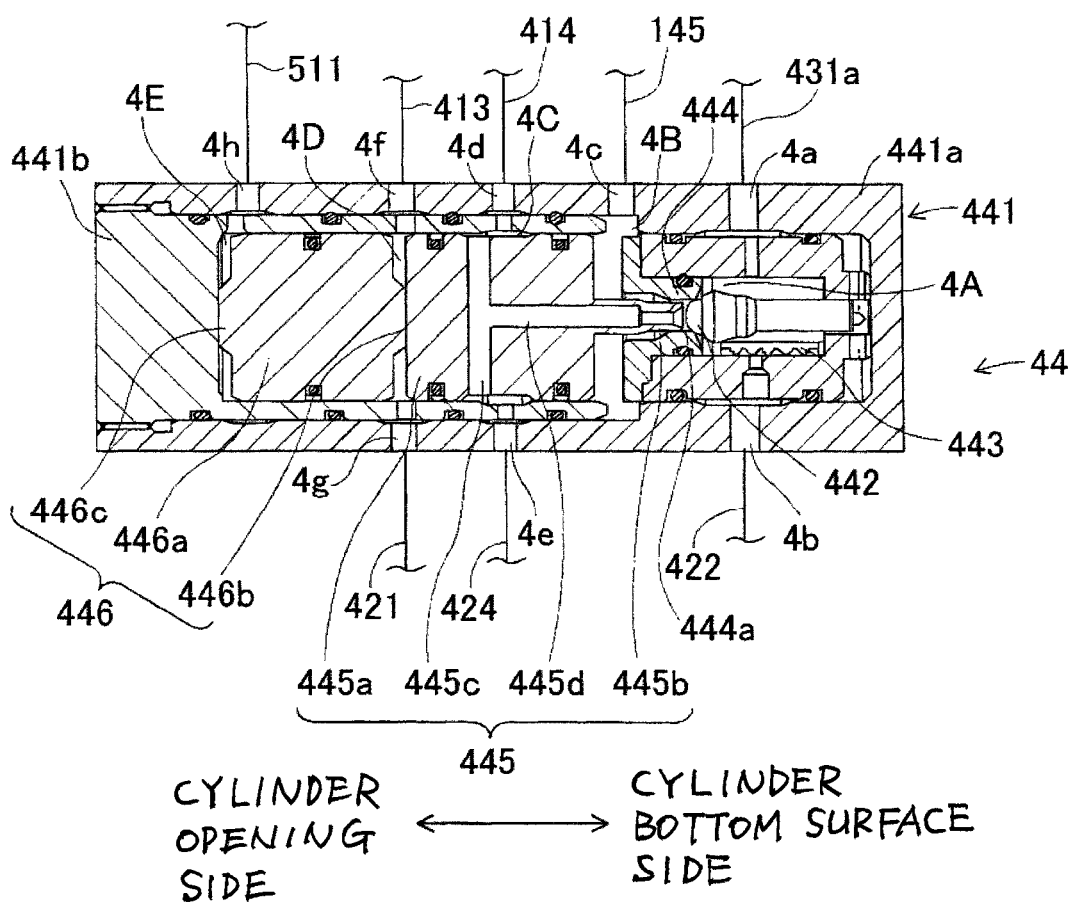
FIG. 2 is a block diagram depicting the configuration, partially sectional, of a regulator of the first embodiment.

Hereinafter, embodiments of the invention will be described by reference to the drawings. It should be noted that the drawings are conceptual drawings, which do not specify dimensions of detailed constructions.

First Embodiment

Configuration of Vehicle Brake Device

Figure 1:
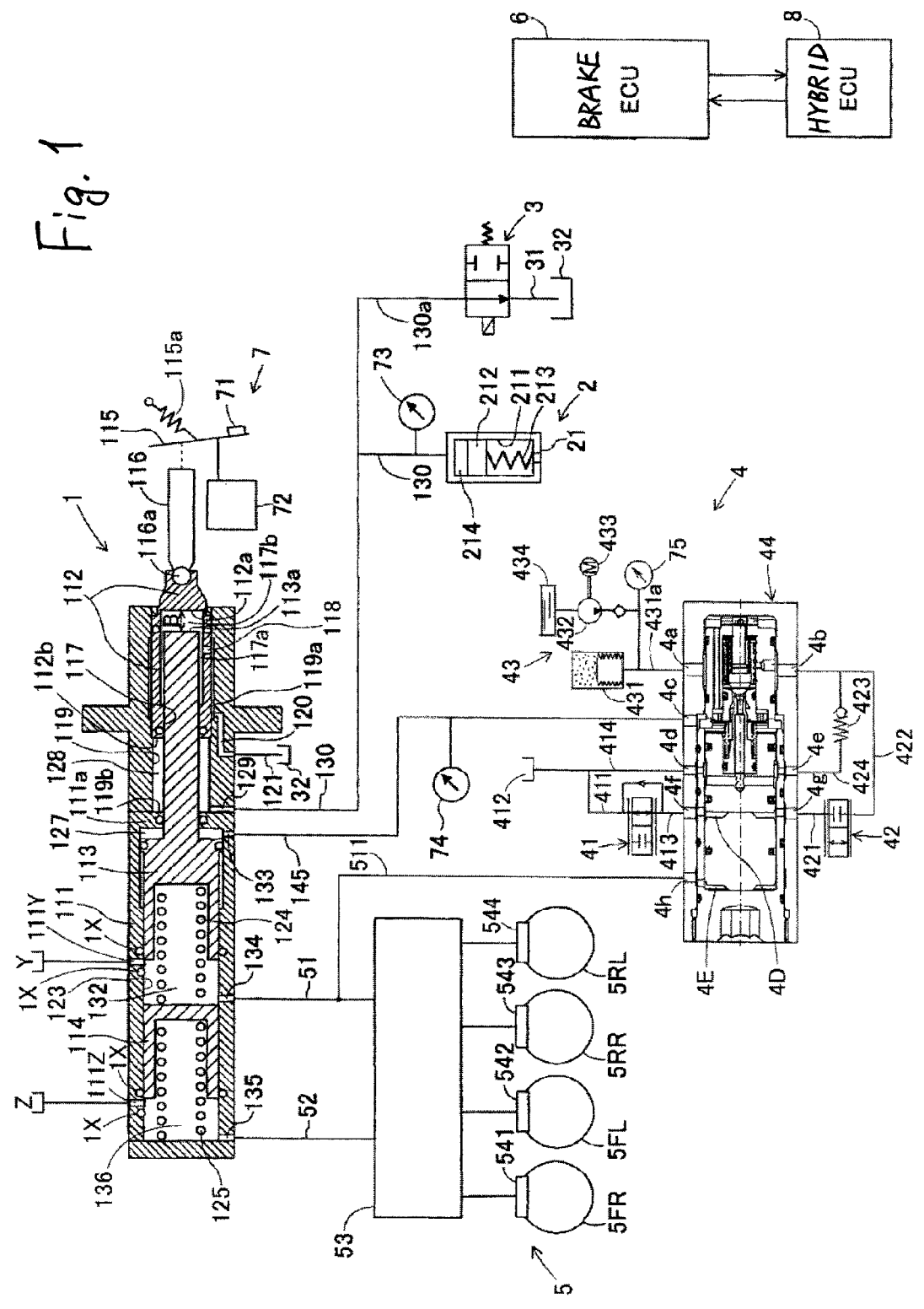

FIG. 1 shows a schematic block diagram of a vehicle brake device according to a first embodiment of the invention. A vehicle brake device of this embodiment includes a master cylinder 1 having master pistons 113, 114 that are disposed in a direction in which an input piston 112 moves forwards with a spacing distance B defined between themselves and the input piston 112 and which slide in an axial direction independently of the input piston, a reaction force generating unit 2 which generates a reaction pressure according to a traveling amount of the input piston 112 in a reaction force chamber 128, a directional control valve 3 which is provided on an open line 31 that is caused to branch off from a fluid line 130 which establishes a communication between the reaction force chamber 128 and the reaction force generating unit 2 and which communicates with a reservoir 32, a brake booster 4 which generates a servo pressure, wheel brakes 5 for wheels 5FR, 5FL, 5RR, 5RL which have wheel cylinders 541 to 544 communicating with master chambers 132, 136 of the master cylinder 1, a brake ECU 6 which controls the directional control valve 3 and the brake booster 4, various sensors 71 to 74 and a hybrid ECU 8 which controls a regenerative braking force. Hereinafter, constituent elements provided in the vehicle brake device of this embodiment will be described in detail. The hybrid ECU 8 is known, and hence, the description thereof will be omitted here. Additionally, the sensors 71 to 74 are configured so as to communicate with the brake ECU 6. The brake ECU6 controls mainly various electromagnetic valves 3, 41, 42 and a motor 433.

(Master Cylinder 1 and Reaction Force Generating Unit 2)

As shown in FIG. 1, the master cylinder 1 includes a cylinder 111 having a cylindrical shape in which a proximal end portion (a right end portion in the figure) is opened while a distal end portion (a left end portion in the figure) is closed, and the input piston 12, the first master piston 113 and the second master piston 114 are fitted and disposed in an interior of the cylinder 111 coaxially and sequentially in this order from the proximal end portion so as to slide in an axial direction. The input piston 112 is disposed so as to protrude partially to the outside of the proximal end portion of the cylinder 111, and a control rod 116 of a brake pedal 115 is coupled to the protruding portion by using a pivot 116a. Thus, the input piston 112 can move via the control rod 116 as a result of the brake pedal 115 being operated by a driver. It should be noted that in this description, the traveling amount of the brake pedal 115 is referred to as a "stroke amount or operation amount."

The input piston 112 is slidably fitted in an input cylinder bore 119 formed a proximal end portion side of the cylinder 111. A shaft bore 117 is formed in a portion of the input piston 112 which is inserted into the input cylinder bore 119. This shaft bore 117 is opened at a distal end portion side and is closed at a proximal end portion side, which makes up a closed surface 112a. A cylindrical rod-shaped portion is slidably fitted in the shaft bore 117, and the cylindrical rod-shaped portion extends from the first master piston 113 to the proximal end portion side through a bulkhead 111a of the cylinder 111. It is configured that the predetermined spacing distance B is ensured between an end face 113a of the rod-shaped portion so fitted and the closed surface 112a of the input piston 112 when the brake pedal 115 is not operated.

The reaction force chamber 128 is formed between a distal end portion side end face 112b of the input piston 112 and the bulkhead 111a which makes up a bottom portion 119b of the input cylinder bore 119. This reaction force chamber 128 is caused to communicate with an outside portion by way of a port 129 which penetrates a circumferential wall of the cylinder 111. This port 129 is connected to a stroke simulator 21 which makes up the reaction force generating unit 2 via a piping 130.

In the stroke simulator 21, a piston 212 is slidably fitted in a cylinder 211. A pilot fluid chamber 214 is formed on a front surface side of the piston 212 which is biased to the front by a compression spring 213. The pilot fluid chamber 214 is caused to communicate with the reaction chamber 128 via the piping 130. When the brake pedal 115 is operated so that the input piston 112 moves to the front, a brake fluid is discharged from the reaction force chamber 128 into the pilot fluid chamber 214, whereby the piston 212 is withdrawn against a spring force which is proportional to a deflection amount of the compression spring 213. This increases the pressure within the reaction force chamber 128 in accordance with a brake pedal operation amount of the brake pedal 115 which is a traveling amount thereof, and a reaction force corresponding to the brake pedal operation amount is imparted to the brake pedal 115. The pressure sensor 73 is provided on the piping 130 for detecting a pressure within the reaction force chamber 128. In this description, the pressure in the reaction force chamber 128 is referred to as a reaction pressure.

The shaft bore 117 in the input piston 112 is formed larger in diameter in the axial direction only over a predetermined length so that a passage 117a having a predetermined gap is formed along the axial direction between an inner circumferential surface of the shaft bore 117 of the input piston 112 and an outer circumferential surface of the rod-shaped portion of the first master piston 113. A through hole 118 is formed in a circumferential wall of the input piston 112 so as to penetrate the circumferential wall to thereby communicate with the passage 117a. Further, the input cylinder bore 119 is formed larger in diameter in the axial direction only over a predetermined length so as to form a passage 119a having a predetermined gap between an outer circumferential surface of the input piston 112 and an inner circumferential surface of the input cylinder bore 119. A passage 120 is formed in the circumferential wall of the cylinder 111 so as to communicate with the passage 119a in a position lying near a distal end thereof. The passage 120 is caused to communicate with the brake fluid reservoir 32 by way of a piping 121. Consequently, a space portion 117b defined between the end face 113a and the closed surface 112a communicates with the reservoir 32 via the passage 117a, the through hole 118, the passage 119a, the passage 120, and the piping 121. This communicating state is maintained irrespective of the brake pedal operation amount, and the space portion 117b is allowed to communicate with the atmosphere at all times.

A pressurizing cylinder bore 123 is formed in the cylinder 111 with the bulkhead 111a held between the pressuring cylinder bore 123 and the input cylinder bore 119. The first master piston 113 has a U-shape in section and is fitted in the pressurizing cylinder bore 123 so as to slide therein. The second master piston 114, which is disposed on a distal end portion side of the first master piston 113, has a U-shape in section and is fitted in the pressuring cylinder hole 123 so as to slide therein.

A servo chamber 127 is formed between the bulkhead 111a and the first master piston 113, a first master chamber 132 is formed between the first master piston 113 and the second master piston 114, and a second master chamber 136 is formed between the second master piston 114 and a distal end closed surface of the pressuring cylinder bore 123. A first compressing spring 124 is interposed between a bottom surface of a U-shaped recess portion of the first master piston 113 and a rear end face of the second master piston 114, and a second compression spring 125 is interposed between a bottom surface of a U-shaped recess portion of the second master piston 114 and a distal end closed surface of the pressurizing cylinder bore 123. By this configuration, in such a state that the brake pedal 115 is rendered inoperative, the first master piston 113 and the second master piston 114 are biased towards the proximal end portion side of the cylinder 111 by the spring elastic force of the first compression spring 124 and the second compression spring 125 to thereby be stopped in respective predetermined inoperative positions.

With the brake pedal 115 rendered inoperative, the input piston 112 is positioned in an initial position by a pedal return spring 115a. Therefore, the end face 113a of the rod-shaped portion of the first master piston 113 is held in a spaced-apart state with a space corresponding to the predetermined distance B defined between itself and the closed surface 112a of the input piston 112. When the driver depresses the brake pedal 115 to move the input piston 112 forwards by the predetermined distance B relative to the first master piston 113, the input piston 112 is brought into abutment with the first master piston 113 so that the input piston 112 is allowed to push it.

The servo chamber 127 is caused to communicate with an external portion by a port 133 which penetrates the circumferential wall of the cylinder 111. A port 134, which penetrates the circumferential wall of the cylinder 111 to an external portion, is formed in the first master chamber 132 defined between the first master piston 113 and the second master piston 114 in a position lying near the rear end face of the second master piston 114 positioned in a predetermined inoperative position. Further, a port 135, which penetrates the circumferential wall of the cylinder 111 to an external portion, is formed in the second master chamber 136 defined between a distal end portion side of the second master piston 114 and the distal end closed surface of the cylinder 111 in a position lying near the distal end closed surface.

The first master piston 113 and the second master piston 114 move forwards in the axial direction to pressurize the first master chamber 132 and the second master chamber 136 by generating a servo pressure in the servo chamber 127 by the brake booster 4, which will be described later. Fluid pressures (master pressures) in the first master chamber 132 and the second master chamber 136 are supplied from the ports 134, 135 to the wheel cylinders 51 to 54 by way of pipings 51, 52 and an ABS 53 as a base fluid pressure, whereby a base braking force (a braking force) is imparted to the wheels 5FR to 5RL.

Seal members such as O-rings indicated by circular marks in FIG. 1 are mounted between the inner circumferential surface of the input cylinder bore 119 and the outer circumferential surface of the input piston 112, between the pressuring cylinder bore 123 and outer circumferential surfaces of the first master piston 113 and the second master piston 114, and between the inner circumferential surface of the shaft bore 117 in the input piston 112 and the bulkhead 111a and the outer circumferential surface of the rod-shaped portion of the first master piston 113, whereby the leakage of fluid is prevented.

Additionally, a port 111Y communicating with a reservoir Y is formed in the cylinder 111 in a position lying at the front of the first master piston 113. Similarly, a port 111Z communicating with a reservoir Z is formed in the cylinder 111 in a position lying at the front of the second master piston 114. Seal members 1X are placed on both sides (at the front and rear) of each of the ports 111Y, 111Z. The communication of the reservoirs Y, Z with the corresponding master chambers 132, 136 is cut off when the master pistons 113, 114 move forwards to thereby be brought into abutment with the corresponding seal members 1X. Note that the sensor 71 is an operation force (depression force) sensor to detect a force with which the driver depresses the brake pedal 115. The sensor 72 is a stroke sensor to detect a stroke amount (an operation amount) of the brake pedal 115.

(Directional Control Valve 3)

The directional control valve 3 is provided between a branch piping 130a which branches off from the piping 130 which establishes a communication between the reaction force chamber 128 and the reaction force generating unit 2 and the open line 31 which communicates with the reservoir 32. For example, an electromagnetic valve can be used for the directional control valve 3. The directional control valve 3 is opened or closed by a control signal from the brake ECU 6. When the directional control valve 3 is opened, the branch piping 130a communicates with the open line 31, whereby the port 129 in the reaction force chamber 128 is allowed to communicate with the reservoir 32. When the directional control valve 3 is closed, a reaction pressure generated by the stroke simulator 21 is imparted to the reaction force chamber 128.

(Brake Booster 4)

The brake booster 4 includes the pressure reducing valve 41, the pressure increasing valve 42, a pressure supply device 43 and a regulator 44. The pressure reducing valve 41 is a normally open electromagnetic valve (a linear valve), whose flow rate is controlled by the brake ECU 6. One side of the pressure reducing valve 41 is connected to a reservoir 412 via a piping 411, and the other side of the pressure reducing valve 41 is connected a piping 413. The pressure increasing valve 42 is a normally closed electromagnetic valve, whose flow rate is controlled by the brake ECU 6. One side of the pressure increasing valve 42 is connected to a piping 421, and the other side of the pressure increasing valve 42 is connected to a piping 422.

The pressure supply device 43 is a device for supplying a highly pressurized brake fluid to the regulator 44 based on an instruction from the brake control ECU 6. The pressure supply device 43 has mainly an accumulator 431, a hydraulic pump 432, the motor 433 and a reservoir 434.

The accumulator 431 (corresponding to a "high pressure source") accumulates fluid pressure generated by the hydraulic pump 432. The accumulator 431 is connected to the regulator 44, a pressure sensor 75 and the hydraulic pump 432 by a piping 431a. The hydraulic pump 432 is connected to the motor 433 and the reservoir 434. The hydraulic pump 432 supplies a brake fluid reserved in the reservoir 434 to the accumulator 431 when the motor 433 is driven.

When the pressure sensor 75 detects that an accumulator pressure is reduced to a predetermined pressure or lower, the motor 433 is driven based on a control signal from the brake ECU 6, and the hydraulic pump 432 supplies the brake fluid to the accumulator 431 to supply the accumulator 431 with pressure energy. The pressure reducing valve 41, the pressure increasing valve 42 and the pressure supply device 43 correspond to a "pilot pressure generating unit."

The regulator 44 (corresponding to a "servo pressure generating unit") is a general regulator having mainly a second piston 446 added thereto and two pilot chambers 4D, 4E formed therein. Namely, as shown in FIG. 2, the regulator 44 includes mainly a cylinder 441, a ball valve 442, a biasing device 443, a valve seat portion 444, a first piston 445 and a second piston 446.

The cylinder 441 is made up of a cylinder case 441a which is a substantially bottomed cylinder having a bottom surface at one end (a right side in the figure) and a lid member 441b which closes an opening (at a left side in the figure) of the cylinder case 441a. It should be noted that although the lid member 441b has a U-shaped section in the figure, in this embodiment, a portion which closes the opening in the cylinder case 441a is described as the lid member 441b which has a cylindrical shape. A plurality of ports 4a to 4h are formed in the cylinder case 441 a so as to establish a communication between an interior and an exterior of the cylinder case 441a.

The port 4a is connected to the piping 431a. The port 4b is connected to the piping 422. The port 4c is connected to a piping 145. The port 4d is connected to a piping 414 which communicates with the reservoir 412. The port 4e is connected, via a relief valve 423, to a piping 424 which communicates with the piping 422. The port 4f is connected to a piping 413. The port 4g is connected to a piping 421. The port 4h is connected to a piping 511 (corresponding to a "master chamber-to-pilot chamber brake fluid line") which branches off from the piping 51 (corresponding to a "master chamber-to-wheel cylinders brake fluid line"). The piping 51 connects the first master chamber 132 with the wheel cylinders 541 to 544 by way of the ABS 53. The piping 511 connects the first master chamber 132 with the second pilot chamber 4E, which will be described later, by way of a part of the piping 51.

The ball valve 442 is a valve of ball type and is disposed in an interior of the cylinder 441 on a bottom surface side of the cylinder case 441a (hereinafter, also referred to as a cylinder bottom surface side). The biasing device 443 is a spring member which biases the ball valve 442 to an opening side of the cylinder case 441 a (hereinafter, also referred to as a cylinder opening side) and is placed at a bottom surface of the cylinder case 441a. The valve seat portion 444 is a wall provided on an inner circumferential surface of the cylinder case 441a and divides the interior of the cylinder case 441 a into a cylinder opening side portion and a cylinder bottom surface side portion. A penetrating passage 444a is formed in the center of the valve seat portion 444 so as to penetrate the valve seat portion 444 in the axial direction for establishment of a communication between a first chamber 4A and a second chamber 4B, which will be described later. The valve seat portion 444 holds the ball valve 442 from the cylinder opening side in such a way that the biased ball valve 442 closes the penetrating passage 444a.

A space defined by the ball valve 442, the biasing device 443, the valve seat portion 444 and an inner circumferential surface of the cylinder case 441a which lies on the cylinder bottom surface side is referred to as the first chamber 4A. The first chamber 4A is filled with a brake fluid, is connected to the piping 431a via the port 4a and is connected to the piping 422 via the port 4b.

The first piston 445 is made up of a substantially cylindrical main body portion 445a and a substantially cylindrical projecting portion 445b which is smaller in diameter than the main body portion 445a. The main body portion 445a is disposed on a cylinder opening side of the valve seat portion 444 in the cylinder 441. The main body portion 445a is disposed coaxially and in a fluid-tight fashion in the cylinder 441 and slides therein. The main body portion 445a is biased towards the cylinder opening side by a biasing member, not shown. A passage 445c is formed in a substantially axial center of the main body portion 445a so as to extend in a circumferential direction (a vertical direction in the figure). This passage 445c is opened to a circumferential surface of the main body portion 445a at both ends thereof. The port 4d is formed in part of an inner circumferential surface of the cylinder 441 which corresponds to a position where an opening of the passage 445c is disposed, and the part of the inner circumferential surface of the cylinder 441 is depressed concavely. Then, a third chamber 4C is defined by the depressed circumferential surface of the cylinder 441 and the main body portion 445a. The communication between the passage 445c and the reservoir 412 is maintained by the provision of the third chamber 4C even when the first piston 445 slides.

The projecting portion 445b projects from the center of a cylinder bottom surface side end face of the main body portion 445a towards the cylinder bottom surface side. A diameter of the projecting portion 445b is smaller than that of the first penetrating passage 444a in the valve seat portion 444. The projecting portion 445b is disposed coaxially with the penetrating passage 444a. A distal end of the projecting portion 445b is spaced a predetermined distance apart from the ball valve 442 towards the cylinder opening side. A passage 445d is formed in the projecting portion 445b, and this passage 445d extends in the cylinder axis direction and is opened to the center of a cylinder bottom surface side end face of the projecting portion 445b. On the other hand, the passage 445d extends deep into the main body portion 445a to connect to the passage 445c.

A space defined by the cylinder bottom surface side end face of the main body portion 445a, an outer surface of the projecting portion 445b, the inner circumferential surface of the cylinder 441, the valve seat portion 444 and the ball valve 442 is referred to as the second chamber 4B. When the first piston 445 is in an inoperative state, the second camber 4B is communicating with the ports 4d, 4e via the passages 445c, 445d and the third chamber 4C.

The second piston 446 is made up of a second main body portion 446a, a first projecting portion 446b and a second projecting portion 446c. The second main body portion 446a has a substantially cylindrical shape. In the cylinder 441, the second main body portion 446a is disposed on a cylinder opening side of the main body portion 445a coaxially and in a fluid-tight fashion. The second main body portion 446a is allowed to slide in the cylinder 441.

The first projecting portion 446b has a substantially cylindrical shape and is smaller in diameter than the second main body portion 446a and projects from the center of a cylinder bottom surface side end face of the second main body portion 446a. The first projecting portion 446b is in abutment with a cylinder opening side end face of the main body portion 445a. The second projecting portion 446c has the same shape as that of the first projecting portion 446b and projects from the center of a cylinder opening side end face of the second main body portion 446a. The second projecting portion 446c is in abutment with the lid member 441b.

A space defined by the cylinder bottom side end face of the second main body portion 446a, an outer surface of the first projecting portion 446b, a cylinder opening side end face of the first piston 445 and the inner circumferential surface of the cylinder 441 is referred to as the first pilot chamber 4D. The first pilot chamber 4D communicates with the pressure reducing valve 41 via the port 4f and the piping 413 and communicates with the pressure increasing valve 42 via the port 4g and the piping 421.

On the other hand, a space defined by the cylinder opening side end face of the second main body portion 446a, an outer surface of the second projecting portion 446c, the lid member 441b and the inner circumferential surface of the cylinder 441 is referred to as the second pilot chamber 4E. The second pilot chamber 4E communicates with the port 134 via the port 4h and the pipings 511, 51. The chambers 4A to 4E are filled with the brake fluid.

(Normal Condition of Power Supply System)

Here, an operation of the brake booster 4 when the power supply system operates normally will be described. Firstly, a linear mode will be described which is a general brake control in which the pressure reducing valve 41 and the pressure increasing valve 42 are controlled by the brake ECU 6.

With the brake pedal 115 not depressed, the state described above or in which the penetrating passage 444a in the valve seat portion 444 is closed by the ball valve 442 occurs in the regulator 44. Additionally, the pressure reducing valve 41 is opened, and the pressure increasing valve 42 is closed. Namely, in this state, the communication between the first chamber 4A and the second chamber 4B is cut off by the ball valve 442 and the valve seat portion 444.

The second chamber 4B communicates with the servo chamber 127, whereby both the chambers are maintained to the same pressure. The second chamber 4B communicates with the third chamber 4C via the passages 445c, 445d in the first piston 445. Consequently, the second chamber 4B and the third chamber 4C communicate with the reservoir 412. One side of the first pilot chamber 4D is closed by the pressure increasing valve 42, and the other side of the first pilot chamber 4D is allowed to communicate with the reservoir 412 via the pressure reducing valve 41, whereby the first pilot chamber 4D and the second chamber 4B are maintained to the same pressure. The second pilot chamber 4E communicates with the first master chamber 132, whereby both the chambers are maintained to the same pressure.

When the brake pedal is depressed from this state, the brake ECU 6 controls the pressure reducing valve 41 and the pressure increasing valve 42 according to information from the stroke sensor 72. Namely, the brake ECU 6 controls the pressure reducing valve 41 in a direction in which the pressure regulating valve 41 is closed and controls the pressure increasing valve 42 in a direction in which the pressure increasing valve 42 is opened.

The communication between the accumulator 431 and the first pilot chamber 4D is established by the pressure increasing valve 42 being opened. The communication between the first pilot chamber 4D and the reservoir 412 is cut off by the pressure reducing valve 41 being closed. The pressure (pilot pressure) in the first pilot chamber 4D can be increased by the brake fluid which is supplied from the accumulator 431. As a result of the pressure in the first pilot chamber 4D being increased, the first piston 445 slides towards the cylinder bottom surface side, whereby a distal end of the projecting portion 445b of the first piston 445 is brought into abutment with the ball valve 442, and the passage 445d is closed by the ball valve 442. Then, the communication between the second chamber 4B and the reservoir 412 is cut off.

Further, by the sliding of the first piston 445 towards the cylinder bottom surface side, the ball valve 442 is pushed to move towards the cylinder bottom surface side by the projecting portion 445b, whereby the ball valve 442 is spaced apart from the valve seat portion 444. By this action of the ball valve 442, the first chamber 4A and the second chamber 4B are allowed to communicate with each other by way of the passage 444a in the valve seat portion 444. The highly pressurized brake fluid is supplied into the first chamber 4A from the accumulator 431, and the pressure in the second chamber 4B is increased by the communication so established.

In association with the increase in the pressure in the second chamber 4B, the pressure in the servo chamber 127 is also increased. By the increase in the pressure in the servo chamber 127, the first master piston 113 moves forwards, and the pressure in the first master chamber 132 is increased. Then, the second master piston 114 also moves forwards, and the pressure in the second maser chamber 136 is increased. The highly pressurized brake fluid is supplied to the following described ABS 53 and the second pilot chamber 4E by increasing the pressure in the first master chamber 132. Although the pressure (pilot pressure) in the second pilot chamber 4E is increased, the pressure in the first pilot chamber 4D is also increased in a similar fashion, and therefore, the second piston 446 does not move. In this way, the brake fluid under high pressure is supplied to the ABS, whereby the wheels brakes 5 are activated to slow down the vehicle.

(With Power Supply System Failing)

Here, a mode when the power supply system fails will be described in which the pressure reducing valve 41, the pressure increasing valve 42 and the directional control valve are not controlled (energized), the first master piston 113 is driven an initial predetermined amount only by the operation force applied to the brake pedal 115 (the pedal effort), and thereafter, the pilot pressure is increased mechanically. This mode is automatically activated based on the construction when the valves are not actuated due to such a failure of the power supply system that the valves are not energized.

When the power supply system fails, the pressure reducing valve 41, the pressure increasing valve 42 and the directional control valve 3 are not energized, in which state the pressure reducing valve 41 is opened, the pressure increasing valve 42 is closed, and the directional control valve 3 is opened. Then, this state (that is, the state in which none of the valves is controlled) is maintained even after the brake pedal 115 is depressed.

With the power supply system failing, when the brake pedal 115 is depressed, the input piston 112 moves forwards. Here, with the directional control valve 3 opened, the reaction force chamber 128 communicates with the reservoir 32, and an increase in reaction pressure by the simulator 21 does not occur. Additionally, since neither the pressure reducing valve 41 nor the pressure increasing valve 42 is controlled, the pressure in the servo chamber 127 is not increased, either. Thus, the first master piston 113 does not move forwards until the input piston 112 comes into abutment with the first master piston 113. Then, only the input piston 112 moves forwards to thereby reduce the spacing distance B, and the input piston 112 eventually comes into abutment with the first master piston 113. The first master piston 113 moves forwards together with the input piston 112 by the operation force applied to the brake pedal 115. When the capacity of the servo chamber 127 is increased as the first master piston 113 moves forwards, the brake fluid is supplied from the reservoir 412.

When the first master piston 113 moves forwards, as with the linear mode, the pressures in the first master chamber 132 and the second master chamber 136 are increased. Then, by the increase in the pressure in the first master chamber 132, the pressure in the second pilot chamber 4E is also increased. By the increase in the pressure in the second pilot chamber 4E, the second piston 446 slides towards the cylinder bottom surface side. At the same time, the first piston 445 is pushed by the first projecting portion 446b to thereby be caused to slide towards the cylinder bottom surface side. By this action of the first piston 445, the projecting portion 445b comes into abutment with the ball valve 442, whereby the ball valve 442 is pushed to move towards the cylinder bottom surface side. Namely, the first chamber 4A and the second chamber 4B communicate with each other, and the communication between the servo chamber 127 and the reservoir 412 is cut off, the brake fluid pressurized highly by the accumulator 431 being supplied into the servo chamber 127.

In this way, when the power supply system fails, with the brake pedal 115 depressed a predetermined stroke by the operation force applied thereto, the accumulator 431 communicates with the servo chamber 127, and the servo pressure is increased mechanically without limit. Then, by being assisted, the first master piston 113 moves forwards more than by the operation force applied to the brake pedal 115 by the driver. By adopting this configuration, even when no power supply is available, the brake fluid under high pressure is supplied to the ABS 53. That is, even when the power supply system fails, a braking force is exhibited according to the operation amount of the brake pedal 115.

According to the construction of this embodiment, when the power supply system fails, the force with which the first master piston 113 is caused to move forwards is exhibited only by the operation force applied to the brake pedal 115 by the driver, and the force with which the first master piston 113 is caused to move forwards is exhibited by the servo pressure that is generated mechanically based on the driving thereof.

(Wheel Brakes 5)

The wheel cylinders 541 to 544 are allowed to communicate with the first master chamber 132 and the second master chamber 136 where a master cylinder pressure is generated via the pipings 51, 52 and the ABS 53. The wheel cylinders 541 to 544 make up the wheel brakes 5 of the wheels 5FR to 5RL. Specifically speaking, the known ABS (Antilock Brake System) 53 is connected to the port 134 of the first master chamber 132 and the port 135 of the second master chamber 136 via the pipings 51, 52, respectively. The wheel cylinders 541 to 544 which activate the wheel brakes which slow down the rotation of the wheels 5FR to 5RL are connected to the ABS 53.

In the linear mode, the fluid pressure discharged from the accumulator 431 of the brake booster 4 is controlled by the pressure increasing valve 42 and the pressure reducing valve 41 to generate a servo pressure in the servo chamber 127, whereby the first master piston 113 and the second master piston 114 move forwards, the first master chamber 132 and the second master chamber 136 being thereby pressurized. Fluid pressures in the first master chamber 132 and the second master chamber 136 are supplied from the ports 134, 135 to the wheel cylinders 541 to 544 by way of the pipings 51, 52 and the ABS 53 as a master cylinder pressure, a braking force being thereby imparted to the wheels 5FR to 5RL.

In this way, according to this embodiment, even when the power supply system fails, the brake fluid in the first master chamber 132 is introduced mechanically into the second pilot chamber 4E according to the operation of the brake pedal 115, and the brake fluid under high pressure is introduced into the servo chamber 127 via the regulator 44. By adopting this configuration, with the vehicle brake device of this embodiment, it is possible to exhibit the braking force which is larger than by the operation force with the assistance of the servo pressure. Additionally, in the first embodiment, the first pilot chamber 4D makes up the control target in the linear mode which is normally performed. By adopting this configuration, in the general linear mode, mainly the first piston 445 only slides, and the sliding resistance generated by the seal members becomes smaller than a sliding resistance that would be generated when the two pistons are driven. Namely, this embodiment is advantageous in response when controlled in the general linear mode. Additionally, since the piping 51 is made use of as the brake fluid line between the second master chamber 136 and the second pilot chamber 4E, the vehicle brake device can be simplified compared with a configuration in which the piping 511 is eliminated and instead of the piping 51, a piping is provided to connect the second master chamber 136 with the second pilot chamber 4E.

Second Embodiment

Figure 3:
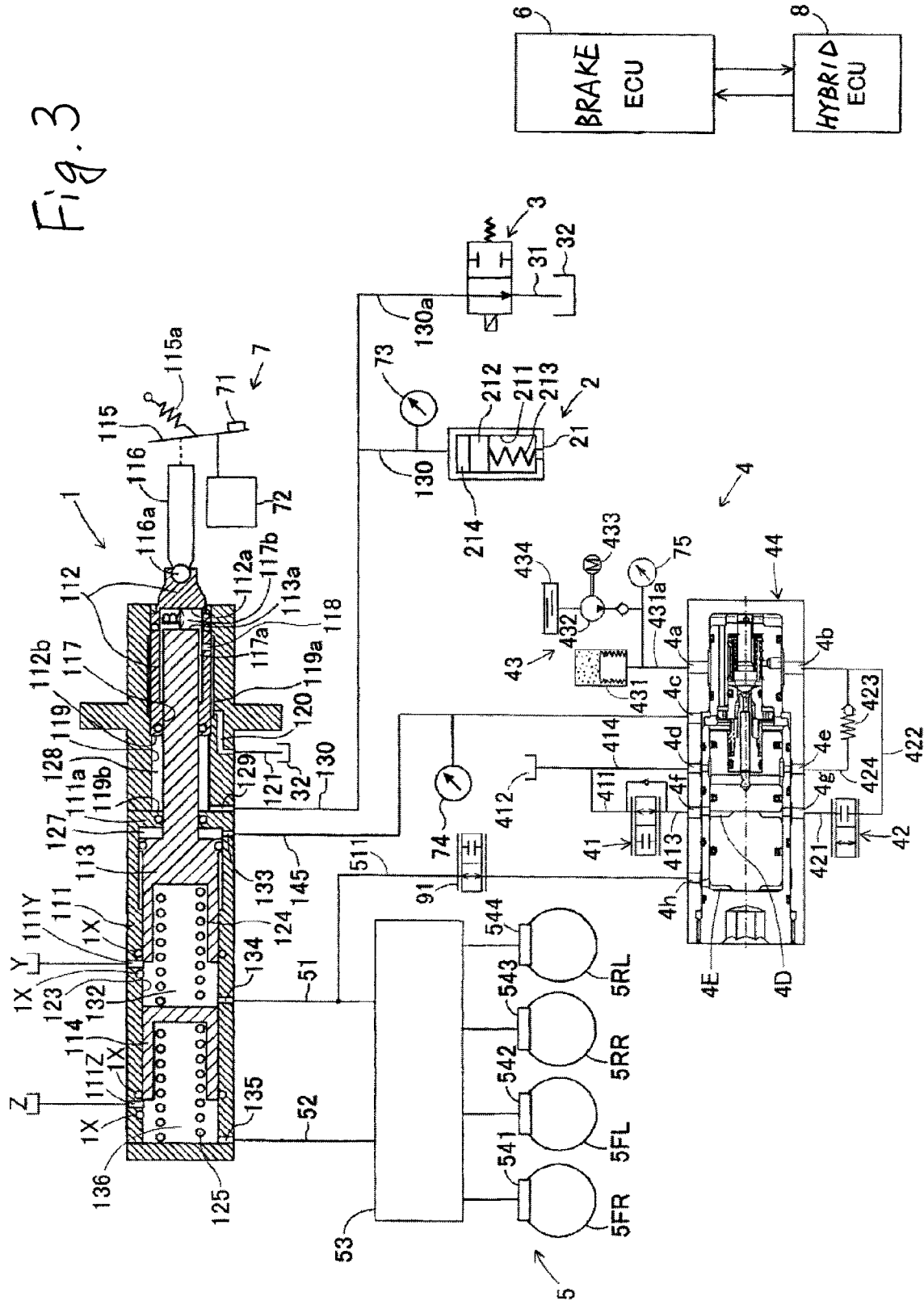
FIG. 3 is a block diagram depicting the configuration of a vehicle brake device of a second embodiment.

As shown in FIG. 3, a vehicle brake device of a second embodiment is such that in the first embodiment, a limit valve 91 is disposed on the piping 511. Consequently, the description of the other configurations will be omitted.

The limit valve 91 (corresponding to a "limit unit") is a normally open electromagnetic valve and is disposed on a piping 511. The limit valve 91 is opened or closed by an instruction from a brake ECU 6. When a pressure in a second pilot chamber 4E becomes larger than a pressure in a first pilot chamber 4D by a pressure supply unit 43 transiently in a linear mode, the brake ECU 6 issues a closure instruction to the limit valve 91.

As a case where the pressure in the second pilot chamber 4E becomes larger than the pressure in the first pilot chamber 4D in the linear mode, for example, a case where the pressure in the first pilot chamber 4D is controlled to be lowered quickly or a case where brake fluids in wheel cylinders 541 to 544 are pumped back by an ABS 53 is considered. Based on this understanding, in the linear mode in which the pressure in the first pilot chamber 4D is controlled by the pressure reducing valve 41 and the pressure increasing valve 42 and the servo pressure is controlled by the pressure in the first pilot chamber 4D, there is caused no such situation that the servo pressure is controlled by a master cylinder pressure (a master pressure) which is introduced into the second pilot chamber 4E.

For example, when the pressure in the first pilot chamber 4D is controlled to be lowered quickly by the control in order to reduce the servo pressure, with a first master chamber 132 communicating with the second pilot chamber 4E, since the pressure in the second pilot chamber 4E becomes larger than the pressure in the first pilot chamber 4D transiently, a second piston 446 slides towards a cylinder bottom surface side (a right-hand side in the figure), disturbing the movement of a first piston 445 towards a cylinder opening side (a left-hand side in the figure). By this action, the first piston 445 is made difficult to move away from a ball valve 442, whereby there are caused fears that a reduction in servo pressure is made slow (delays) relative to the control by the brake ECU 6. With the first master chamber 132 communicating with the second pilot chamber 4E, there are fears that the transient delay in response occurs.

In addition, when the ABS 53 pumps back the brake fluids in the wheel cylinders 541 to 544, in the event that the first master chamber 132 is communicating with the second pilot chamber 4E, the pressure in the second pilot chamber 4E becomes larger than the pressure in the first pilot chamber 4D transiently. Therefore, the pressure in the second pilot chamber 4E and the pressures in a first chamber 4A and a second chamber 4B become the same to be balanced against each other. As this occurs, the servo pressure is increased to a high level, and the brake ECU 6 issues a pressure reduction instruction. However, even in the event that the pressure in the first pilot chamber 4D is reduced, since the pressures in the chambers 4E, 4B which lies on both sides of the first pilot chamber 4D are balanced at the high pressure, the first piston 445 cannot be caused to slide in a pressure reducing direction. Due to this, the brake ECU 6 keeps issuing the pressure reduction instruction, whereby the pressure in the first pilot chamber 4D is kept reduced. Additionally, a case can occur where a control is executed with a smaller pressure than a pressure which is actually wanted (a target servo pressure) relative to the operation of a brake pedal 115. In the event that the first master chamber 132 is kept communicating with the second pilot chamber 4E, the time lag in control can be caused.

According to the second embodiment, the transient delay or time lag in control can be prevented by controlling the limit valve 91 to cut off the flow of brake fluid in the piping 511. Additionally, even when a power supply system fails, the limit valve 91 is kept open (deenergized), whereby an advantage similar to that exhibited in the first embodiment is exhibited. It should be noted that the limit valve 91 may be fed from a separate power supply system from the power supply for the vehicle brake device and is not limited to a normally open type. In addition, the limit valve 91 is not limited to an electromagnetic valve and may be any type of valve device, provided that the valve device can control to establish or cut off the communication or flow of brake fluid.

Third Embodiment

Figure 4:
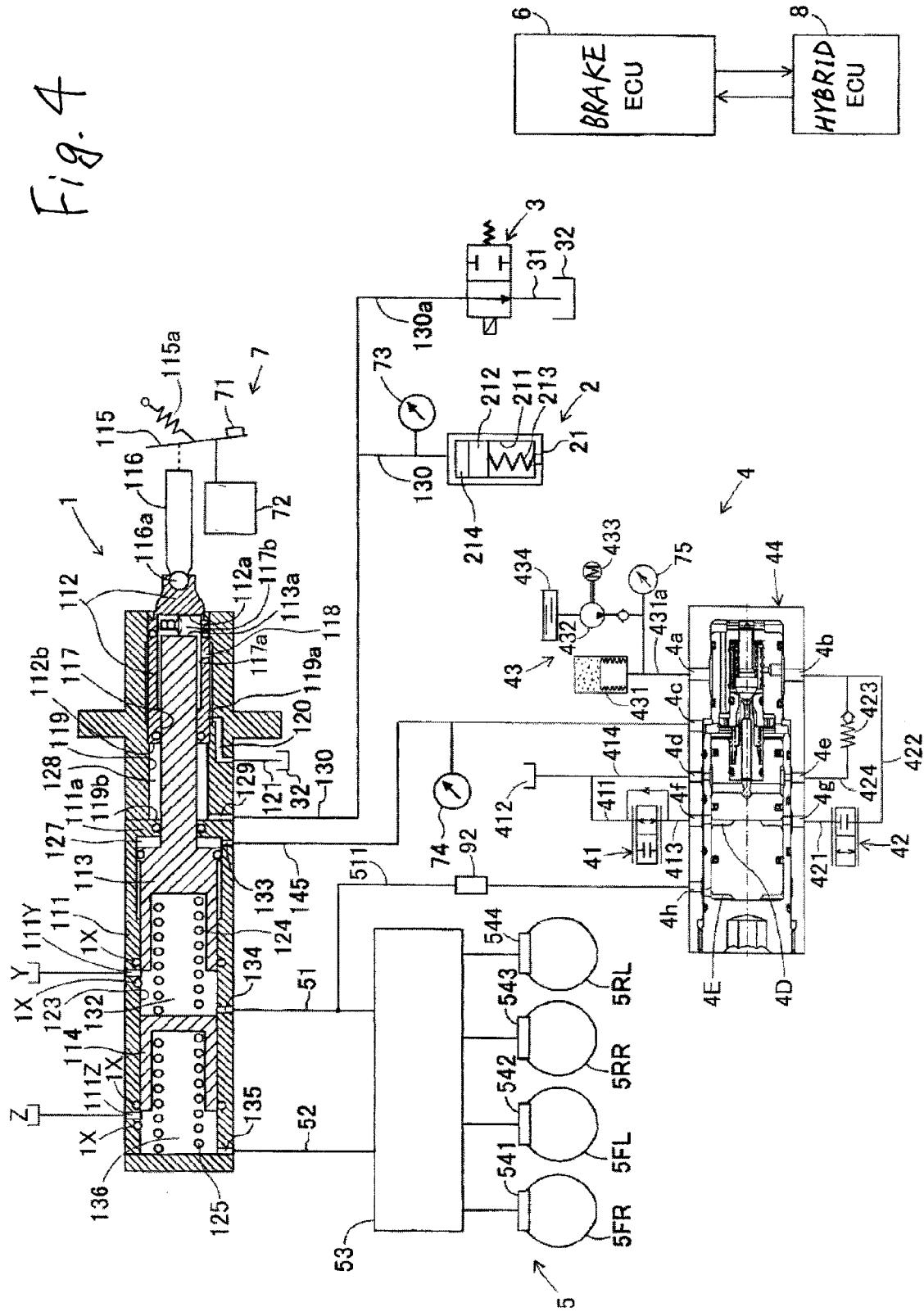
FIG. 4 is a block diagram depicting the configuration of a vehicle brake device according to a third embodiment.

As shown in FIG. 4, a vehicle brake device of a third embodiment is such that in the first embodiment, an orifice (a constriction) 92 is disposed on the piping 511. Therefore, the description of the other configurations will be omitted.

The orifice 92 (corresponding to the "limit unit") is disposed on a piping 511 to limit the flow of brake fluid in the piping 511. The orifice 92 suppresses a quick flow of brake fluid within the piping 511 by making it difficult for a large amount of brake fluid to flow therethrough at one time. Specifically speaking, the orifice 92 mitigates a speed at which the pressure in a second pilot chamber 4E is reduced as a result of a pressure increasing operation by an ABS 53. By preventing a quick reduction in pressure in the second pilot chamber 4E, it is possible to allow for an extra time in controlling the pressure in a first pilot chamber 4D when the pressure in the second pilot chamber 4E is reduced. For example, in a control in which the pressure in the first pilot chamber 4D is increased, by slowing the pressure reduction in the second pilot chamber 4E, it is possible to reduce a loss in reaching a target servo pressure. According to the third embodiment, although the pressure increase in the second pilot chamber 4E is made slow, as to pressure increase, there will be no problem as long as the pressure therein is increased eventually, and therefore, an advantage similar to the advantage exhibited in the first embodiment is exhibited.

Fourth Embodiment

Figure 5:
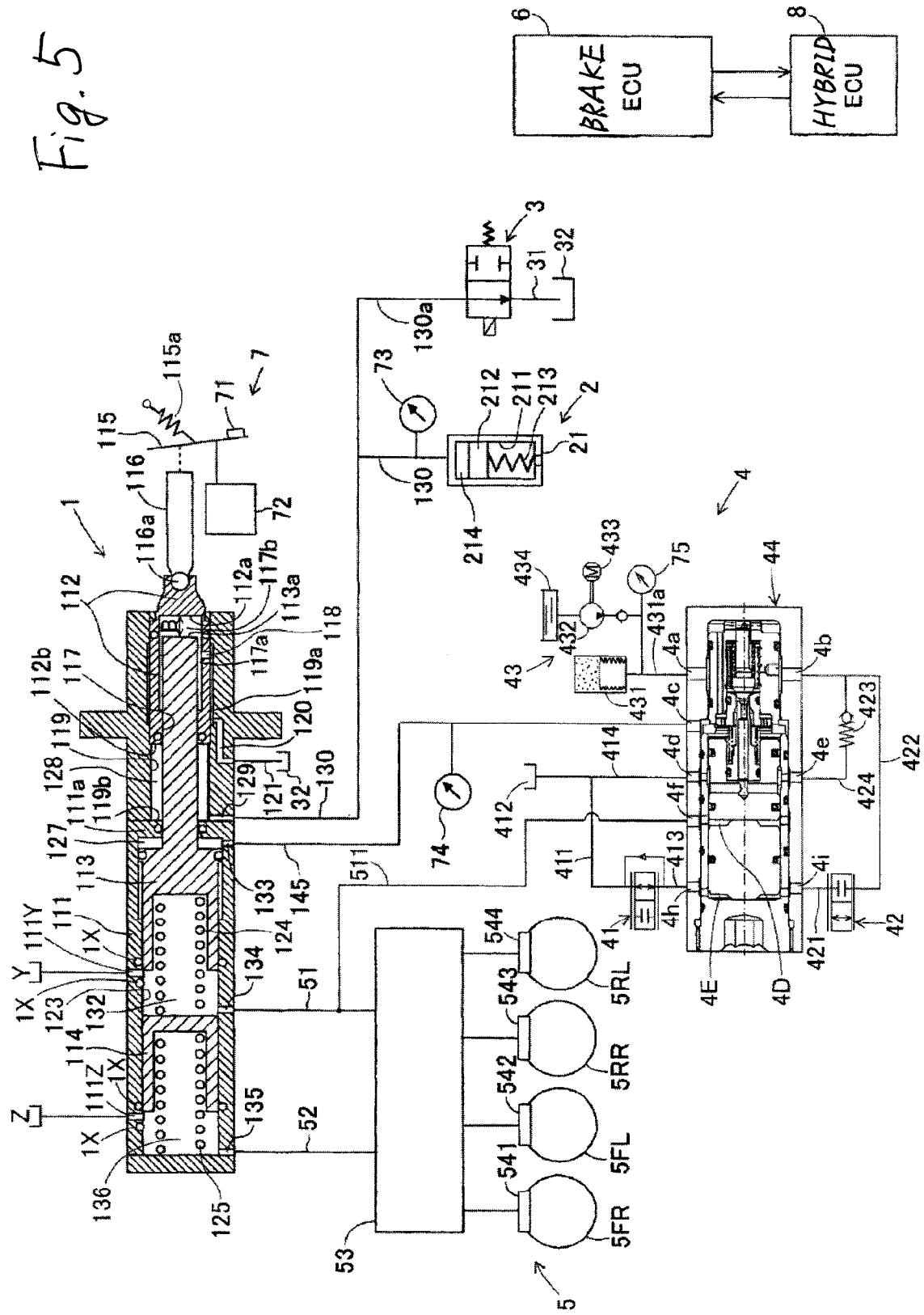
FIG. 5 is a block diagram depicting the configuration of a vehicle brake device according to a fourth embodiment.

As shown in FIG. 5, a vehicle brake device of a fourth embodiment is such that in the first embodiment, mainly a destination to which the piping 511 is connected is changed. Consequently, the description of the other configurations will be omitted.

In the fourth embodiment, one end of a piping 511 is connected not to a port 4h but to a port 4f. A port 4i is formed. Namely, the piping 511 is connected to a first master chamber 132 and a first pilot chamber 4D via a piping 51. The pressure in the first master chamber 132 becomes the same pressure as that in the first pilot chamber 4D. It should be noted that the port 4g is eliminated (closed), and the port 4i is formed which establishes a communication between a second pilot chamber 4E and an external portion. Additionally, a piping 413 which is connected to a pressure reducing valve 41 is connected not to a port 4f but to a port 4h. In addition, a piping 421 which is connected to a pressure increasing valve 42 is connected to the port 4i. Namely, the pressure in the second pilot chamber 4E is controlled by the pressure reducing valve 41 and the pressure increasing valve 42 based on an instruction from a brake ECU 6.

Even with this configuration, the second pilot chamber 4E fulfils the role of the first pilot chamber 4D in the first embodiment, and the first pilot chamber 4D fulfils the role of the second pilot chamber 4E in the first embodiment. Therefore, an advantage similar to the advantage exhibited in the first embodiment is exhibited. Additionally, even in the fourth embodiment, by providing a limit unit (for example, a limit valve 91 or an orifice 92) on the piping 511, the function and advantage which are similar to those in the second embodiment or the third embodiment are exhibited. In addition, the second pilot chamber 4E makes up a control target in a linear mode, and although the sliding resistance in a normal control becomes large, due to a second piston 446 being driven normally, the second piston 446 is prevented from being secured. Additionally, according to the fourth embodiment, when a power supply system fails, a master pressure is introduced into the first pilot chamber 4D, and therefore, only a first piston 445 should be driven, whereby a braking force is exhibited with good response when the power supply system fails.

Fifth Embodiment

Figure 6:
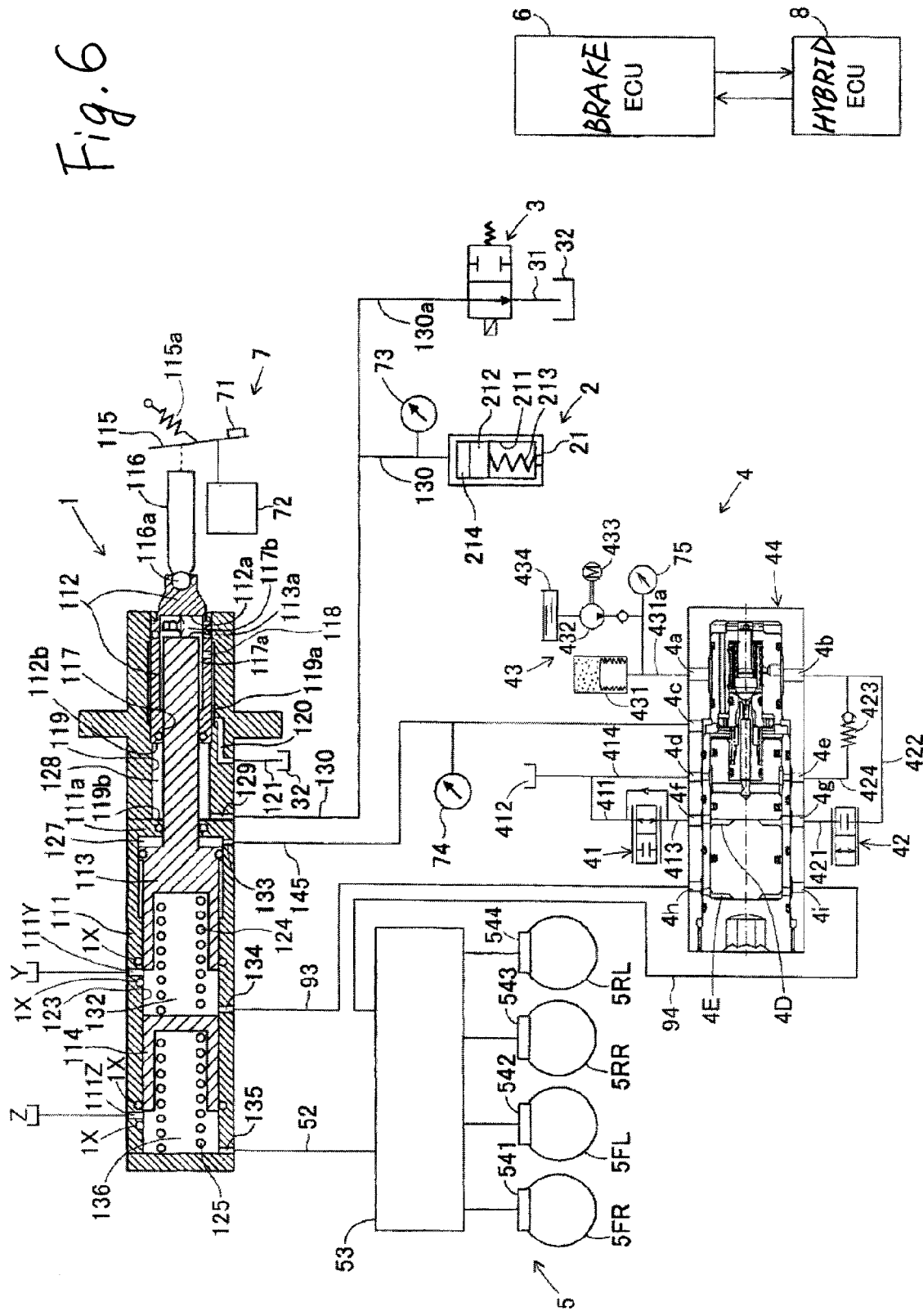
FIG. 6 is a block diagram depicting the configuration of a vehicle brake device according to a fifth embodiment.

As shown in FIG. 6, a vehicle brake device of a fifth embodiment is such that in the first embodiment, mainly a change is made to the piping. Consequently, the description of the other configurations will be omitted.

In the fifth embodiment, pipings 93, 94 are provided in place of the pipings 51, 511 in the first embodiment. One end of the piping 93 is connected to a port 134, and the other end of the piping 93 is connected to a port 4h. Namely, the piping 93 (corresponding to a "master chamber-to-pilot chamber brake fluid line") connects a first master chamber 132 with a second pilot chamber 4E.

Additionally, a port 4i is formed in a regulator 44 on a cylinder opening side of a port 4g so as to establish a communication between a second pilot chamber 4E and an external portion. One end of the piping 94 is connected to the port 4i, and the other end of the piping 94 is connected to an ABS 53. Namely, the piping 94 (corresponding to a "pilot chamber-to-wheel cylinders brake fluid line") connects the second pilot chamber 4E with wheel cylinders 541 to 544 via the ABS 53.

According to this configuration, the first master chamber 132 communicates with the wheel cylinders 541 to 544 via the piping 93, the second pilot chamber 4E and the piping 94. A brake fluid under master cylinder pressure is supplied to the ABS 53 and the wheel cylinders 541 to 544 via the second pilot chamber 4E.

Even with the fifth embodiment, the pressure in the first master chamber 132 and the pressure in the second pilot chamber 4E becomes the same, and the function and advantage similar to those in the first embodiment are exhibited. Further, according to the fifth embodiment, since the second pilot chamber 4E is connected to the two pipings 93, 94, bleeding air from the regulator 44 is facilitated.

Figure 7:
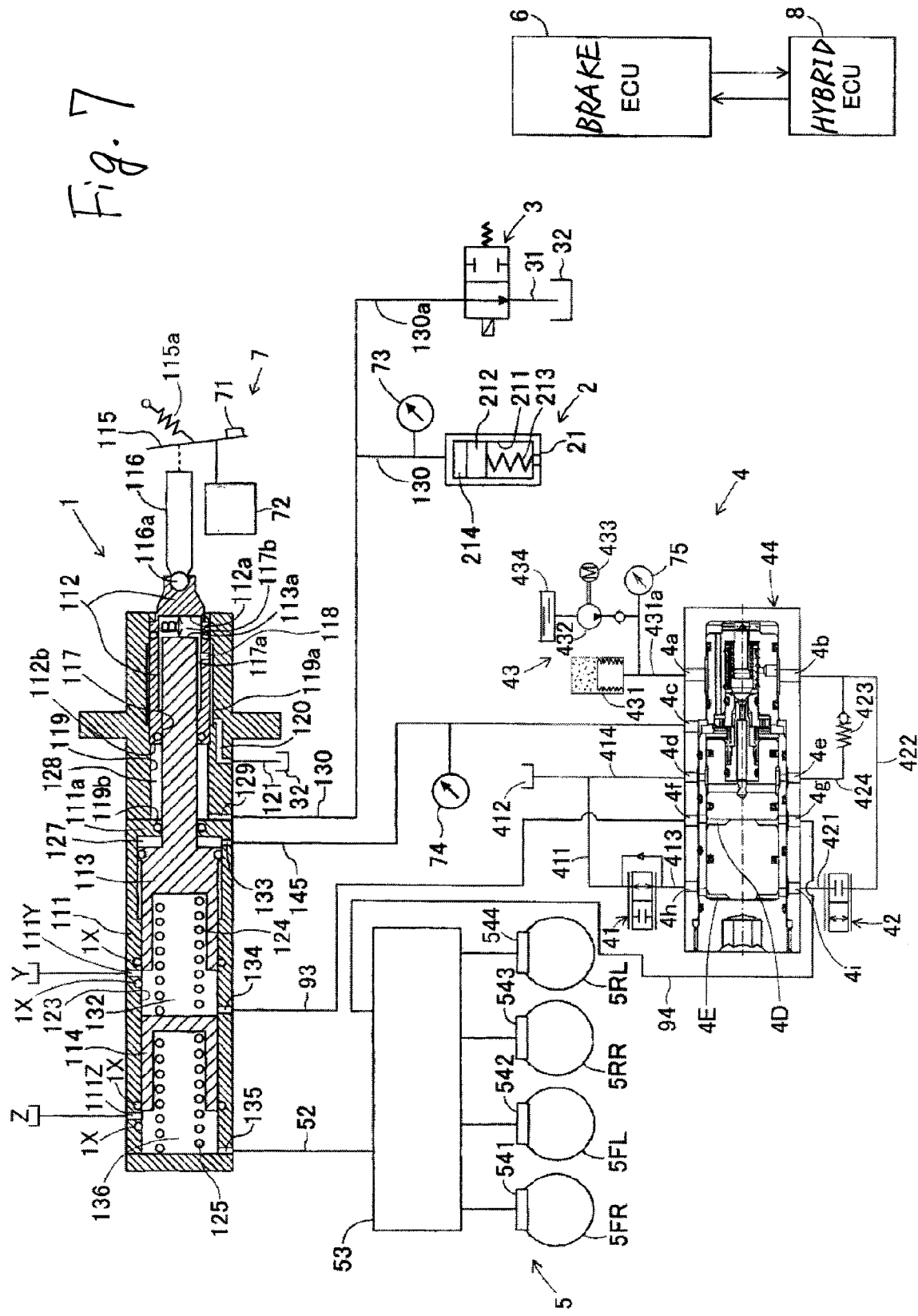
FIG. 7 is a block diagram depicting the configuration of a modified example made to the vehicle brake device of the fifth embodiment.

It should be noted that as shown in FIG. 7, in the fifth embodiment, the pipings 93, 94 and the pipings 413, 421 may be replaced with each other. As this occurs, the piping 93 is connected to the first master chamber 132 (the port 134) and a first pilot chamber 4D (a port 4f). The piping 94 is connected to the first pilot chamber 4D (a port 4g) and the wheel cylinders 541 to 544 (the ABS 53). Additionally, the piping 413 is connected to a port 4h, and the piping 421 is connected to the port 4i. According to this configuration, the first master chamber 132 communicates with the wheel cylinders 541 to 544 via the piping 93, the first pilot chamber 4D and the piping 94. Even with this configuration, maintenance work such as air bleeding is facilitated. In addition, since the second pilot chamber 4E makes up a control target in a linear mode, an advantage similar to that exhibited in the fourth embodiment is exhibited. It should be noted that in the invention, the pressure reducing valve 41 and the pressure increasing valve 42 may be connected to a single port relative to the pilot chamber 4D or 4E.

What is claimed is:

1. A vehicle brake device comprising:
   a master cylinder in which a master piston is driven so as to move by a servo pressure in a servo chamber and in which a master pressure in a master chamber is changed by the movement of the master piston;
   a mechanical servo pressure generating unit that is connected to a high pressure source and the servo chamber and which generates a servo pressure within the servo chamber according to a pilot pressure within a pilot chamber on the basis of a brake fluid pressure of the high pressure source;
   an electrical pilot pressure generating unit that is connected to the pilot chamber and which generates a desired pilot pressure within the pilot chamber; and
   a master chamber-to-pilot chamber brake fluid line which connects between the master chamber with the pilot chamber, wherein
   when a power supply system operates normally, the pilot pressure is generated by the pilot pressure generating unit, while when the power supply system fails, the master pressure is used as a pilot pressure, and wherein
   the master chamber-to-pilot chamber brake fluid line branches off from a master chamber-to-wheel cylinders brake fluid line which connects between the master chamber and wheel cylinders.

2. The vehicle brake device according to claim 1, further comprising:
   a limit unit that is disposed in the master chamber-to-pilot chamber brake fluid line and which limits a brake fluid that flows in or out of the pilot chamber.

3. The vehicle brake device according to claim 2, wherein the limit unit includes a valve device that can control the opening and closure of the master chamber-to-pilot chamber brake fluid line.

4. The vehicle brake device according to claim 3, wherein the valve device is of a normally open type.

5. The vehicle brake device according to claim 4, wherein the limit unit includes an orifice that is formed in the master chamber-to-pilot chamber brake fluid line.

6. The vehicle brake device according to claim 1, further comprising:
   a pilot chamber-to-wheel cylinders brake fluid line which connects the pilot chamber with the wheel cylinders, wherein the master chamber and the wheel cylinders can communicate with each other via the master chamber-to-pilot chamber brake fluid line, the pilot chamber and the pilot chamber-to-wheel cylinders brake fluid line.

7. The vehicle brake device according to claim 6, wherein the servo pressure generating unit has a first piston and a second piston, as well as a first pilot chamber and a second pilot chamber which are formed as the pilot chamber, the first piston being driven by a pilot pressure in the first pilot chamber, the first piston and the second piston being driven by a pilot pressure in the second pilot chamber, wherein the pilot pressure generating unit is connected to the first pilot chamber, wherein the master chamber-to-pilot chamber brake fluid line is connected to the master chamber and the second pilot chamber, wherein the pilot chamber-to-wheel cylinders brake fluid line is connected to the second pilot chamber and the wheel cylinders, and wherein the master chamber and the wheel cylinders can communicate with each other via the master chamber-to-pilot chamber brake fluid line, the second pilot chamber and the pilot chamber-to-wheel cylinders brake fluid line.

8. The vehicle brake device according to claim 6, wherein the servo pressure generating unit has a first piston and a second piston, as well as a first pilot chamber and a second pilot chamber which are formed as the pilot chamber, the first piston being driven by a pilot pressure in the first pilot chamber, the first piston and the second piston being driven by a pilot pressure in the second pilot chamber, wherein the pilot pressure generating unit is connected to the second pilot chamber, wherein the master chamber-to-pilot chamber brake fluid line is connected to the master chamber and the first pilot chamber, wherein the pilot chamber-to-wheel cylinders brake fluid line is connected to the first pilot chamber and the wheel cylinders, and wherein the master chamber and the wheel cylinders can communicate with each other via the master chamber-to-pilot chamber brake fluid line, the first pilot chamber and the pilot chamber-to-wheel cylinders brake fluid line.

9. The vehicle brake device according to claim 1, wherein the servo pressure generating unit has a first piston and a second piston, as well as a first pilot chamber and a second pilot chamber which are formed as the pilot chamber, the first piston being driven by a pilot pressure in the first pilot chamber, the first piston and the second piston being driven by a pilot pressure in the second pilot chamber, wherein the pilot pressure generating unit is connected to the first pilot chamber, and wherein;

the master chamber-to-pilot chamber brake fluid line is connected to the master chamber and the second pilot chamber.

10. The vehicle brake device according to claim 1, wherein the servo pressure generating unit has a first piston and a second piston, as well as a first pilot chamber and a second pilot chamber which are formed as the pilot chamber, the first piston being driven by a pilot pressure in the first pilot chamber, the first piston and the second piston being driven by a pilot pressure in the second pilot chamber, wherein the pilot pressure generating unit is connected to the second pilot chamber, and wherein the master chamber-to-pilot chamber brake fluid line is connected to the master chamber and the first pilot chamber.

* * * * *